United States Patent [19]

Jordine et al.

[11] Patent Number: 5,541,301

[45] Date of Patent: Jul. 30, 1996

[54] FIBER-REACTIVE MONOAZO DYES CONTAINING A PHENYLAMINO-SUBSTITUTED TRIAZINYL GROUP

[75] Inventors: Guido Jordine, Freiburg, Germany; Jean-Marie Adam, Rosenau, France

[73] Assignee: Ciba-Geigy Corporation, Tarrytown, N.Y.

[21] Appl. No.: 352,995

[22] Filed: Dec. 9, 1994

[30] Foreign Application Priority Data

Dec. 13, 1993 [CH] Switzerland ............... 3702/93

[51] Int. Cl.$^6$ ............... C09B 62/085; C09B 62/51; D06P 1/382; D06P 1/384
[52] U.S. Cl. ............... 534/635; 534/636; 534/638
[58] Field of Search ............... 534/638, 636, 534/635

[56] References Cited

U.S. PATENT DOCUMENTS

| | | | |
|---|---|---|---|
| 4,191,687 | 3/1980 | Austin | 534/638 |
| 4,837,310 | 6/1989 | Morimitsu et al. | 534/638 |

FOREIGN PATENT DOCUMENTS

| | | |
|---|---|---|
| 71985 | 2/1983 | European Pat. Off. |
| 208829 | 1/1987 | European Pat. Off. |
| 241104 | 10/1987 | European Pat. Off. |
| 56-140185 | 11/1981 | Japan. |
| 57-049663 | 3/1982 | Japan. |
| 60-47071 | 3/1985 | Japan. |
| 60-215061 | 10/1985 | Japan ............... 534/636 |
| 62-164765 | 7/1987 | Japan. |
| 2034343 | 1/1980 | United Kingdom. |

OTHER PUBLICATIONS

Chem. Abstract, 107, 238570p (1987).
Chem. Abstract, 107, 238572r (1987).
Derwent Abstract 84—309180/50 (1983).
Chem. Abstracts, vol. 102, 222146r (1985)(JP-A-6047071).
Chem. Abstracts, vol. 97, 57111u (1982)(JP-A-57 049663).
Chem. Abstracts, vol. 96, 87015n (1982)(JP-A-56 140185).
Morimitsu et al, Chemical Abstracts, 107: 219139 (1987).

*Primary Examiner*—Fiona T. Powers
*Attorney, Agent, or Firm*—Kevin T. Mansfield

[57] ABSTRACT

Reactive dyes of formula

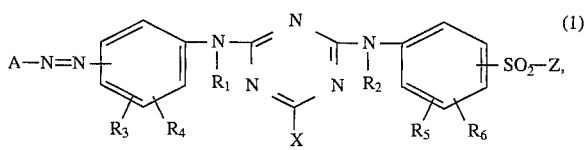

wherein $R_1$ and $R_2$ are each independently of the other hydrogen or $C_1$–$C_4$alkyl, $R_3$, $R_4$, $R_5$ and $R_6$ are each independently of one another hydrogen, $C_1$–$C_4$alkyl, $C_1$–$C_4$alkoxy, $C_2$–$C_4$alkanoylamino, ureido or halogen, X is chloro or fluoro, Z is a group of formula —CH=CH$_2$ or —CH$_2$—CH$_2$—Y, and Y is a leaving group, and A is as defined in claim 1, are particularly suitable for dyeing or printing cellulosic fiber materials or natural or synthetic polyamide fiber materials in high tinctorial yield, and give dyeings and prints with good fastness properties.

12 Claims, No Drawings

FIBER-REACTIVE MONOAZO DYES CONTAINING A PHENYLAMINO-SUBSTITUTED TRIAZINYL GROUP

The present invention relates to novel reactive dyes, to the preparation thereof and to the use thereof for dyeing or printing fibre materials.

The practice of dyeing with reactive dyes has given rise in recent times to more stringent requirements being made of the quality of the dyeings and to the economy of the dyeing process. For this reason, there is still a need for novel reactive dyes with improved properties, especially application properties.

At the present time it is necessary to provide reactive dyes which have sufficient substantivity and which at the same time have good washing off properties with respect to unfixed dye. The dyes shall have a good tinctorial yield and high reactivity, and they shall in particular give dyeings with high fixation. The dyeings obtained with said reactive dyes shall also have good fibre levelness. The dyes of the prior art do not meet these requirements in all respects.

The present invention therefore has for its object to provide novel improved reactive dyes for dyeing and printing fibre materials which have the above specified qualities to a high degree. The novel dyes shall be distinguished in particular by excellent fixation yield and superior fibre-dye bond stability, and further they shall have the property of being easily washed off to remove unfixed dye. They shall also produce dyeings with good allround fastness properties, for example lightfastness and wetfastness.

It has been found that this object is substantially achieved with the novel reactive dyes defined below.

Accordingly, the invention relates to reactive dyes of formula

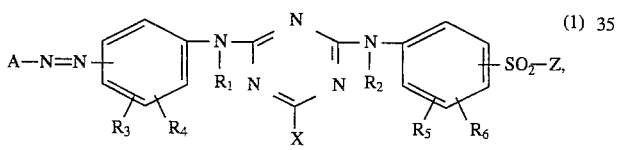

wherein $R_1$ and $R_2$ are each independently of the other hydrogen or $C_1$–$C_4$alkyl, $R_3$, $R_4$, $R_5$ and $R_6$ are each independently of one another hydrogen, $C_1$–$C_4$alkyl, $C_1$–$C_4$alkoxy, $C_2$–$C_4$alkanoylamino, ureido or halogen, X is chloro or fluoro, Z is a group of formula —CH=CH$_2$ or —CH$_2$—CH$_2$—Y, and Y is a leaving group, and A is a radical of formula

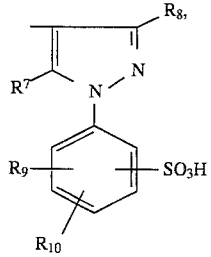

wherein $R_7$ is amino or hydroxyl, $R_8$ is methyl or carboxyl, and $R_9$ and $R_{10}$ are each independently of the other hydrogen, $C_1$–$C_4$alkyl, $C_1$–$C_4$alkoxy, $C_2$–$C_4$alkanoylamino or halogen;

or a radical of formula

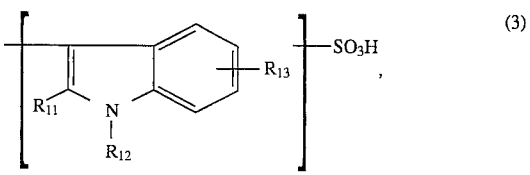

wherein $R_{11}$ is hydrogen, $C_1$–$C_8$alkyl or phenyl which is unsubstituted or substituted by $C_1$–$C_4$alkyl, $C_1$–$C_4$alkoxy, $C_2$–$C_4$alkanoylamino or halogen, $R_{12}$ is hydrogen or $C_1$–$C_8$alkyl, and $R_{13}$ is hydrogen, $C_1$–$C_4$alkyl, $C_1$–$C_4$alkoxy, $C_2$–$C_4$alkanoylamino or halogen;

or a radical of formula

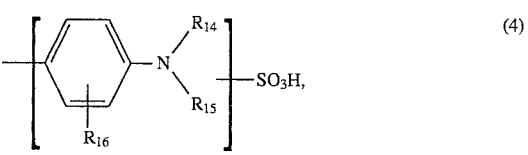

wherein $R_{14}$ and $R_{15}$ are each independently of the other hydrogen or $C_1$–$C_4$alkyl which is unsubstituted or substituted by cyano, hydroxyl, phenyl or $C_5$–$C_7$cycloalkyl, phenyl being unsubstituted or substituted by $C_1$–$C_4$alkyl, $C_1$–$C_4$alkoxy, $C_2$–$C_4$alkanoylamino or halogen and $C_5$–$C_7$cycloalkyl being unsubstituted or substituted by $C_1$–$C_4$alkyl, and $R_{16}$ is hydrogen, $C_1$–$C_4$alkyl, $C_2$–$C_4$alkoxy, $C_2$–$C_4$alkanoylamino or halogen;

or a radical of formula

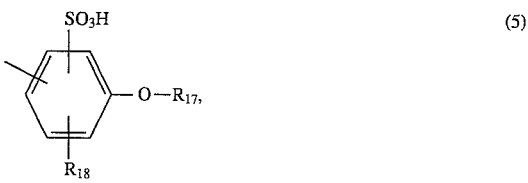

wherein $R_{17}$ is hydrogen or $C_1$–$C_4$alkyl, and $R_{18}$ is hydrogen, $C_1$–$C_4$alkyl, $C_1$–$C_4$alkoxy, $C_2$–$C_4$alkanoylamino or halogen;

or a radical of formula

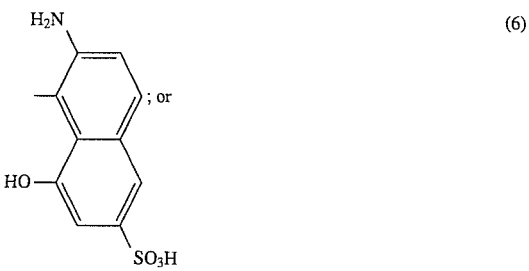

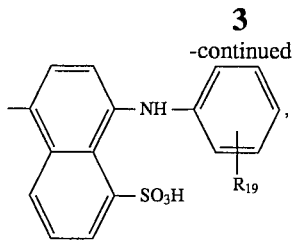

(7)

wherein $R_{19}$ is hydrogen, $C_1-C_4$alkyl, $C_1-C_4$alkoxy, $C_2-C_4$alkanoylamino or halogen.

Y is preferably a group of formula —Cl, —OSO$_3$H, —SSO$_3$H, —OCO—CH$_3$, —OCO—C$_6$H$_5$ or —OPO$_3$H$_2$, more particularly a group of formula —Cl or —OSO$_3$H and, most preferably, a group of formula —OSO$_3$H.

Z is preferably a group of formula —CH$_2$—CH$_2$—OSO$_3$H.

The reactive dyes of formula (1) contain only one sulfo group which is present in the radical A.

X is preferably chloro.

$C_1-C_4$alkyl in $R_1$, $R_2$, $R_3$, $R_4$, $R_5$, $R_6$, $R_9$, $R_{10}$, $R_{13}$, $R_{14}$, $R_{15}$, $R_{16}$, $R_{17}$, $R_{18}$ and $R_{19}$ may suitably be methyl, ethyl, propyl, isopropyl, butyl, isobutyl, sec-butyl or tert-butyl, preferably methyl or ethyl. The same meanings and preferred meanings apply to the other $C_1-C_4$alkyl substituents cited above. $R_{14}$ and $R_{15}$ may also suitably be the corresponding alkyl radicals substituted as indicated above.

$R_{11}$ and $R_{12}$ defined as a $C_1-C_8$alkyl radical are typically methyl, ethyl, propyl, isopropyl, butyl, isobutyl, sec-butyl, tert-butyl and straight chain or branched pentyl, hexyl, heptyl or octyl.

$R_3$, $R_4$, $R_5$, $R_6$, $R_9$, $R_{10}$, $R_{13}$, $R_{16}$, $R_{18}$ and $R_{19}$ defined as $C_1-C_4$alkoxy may suitably be methoxy, ethoxy, propoxy, isopropoxy, butoxy, sec-butoxy, isobutoxy or tert-butoxy, preferably methoxy or ethoxy. The same meanings and preferred meanings apply to the other $C_1-C_4$alkoxy substituents cited above.

$R_3$, $R_4$, $R_5$, $R_6$, $R_9$, $R_{10}$, $R_{13}$, $R_{16}$, $R_{18}$ and $R_{19}$ defined as $C_2-C_4$alkanoylamino may suitably be acetylamino, propionylamino or butyrylamino and, preferably, acetylamino. The same meanings and preferred meanings apply to the other $C_2-C_4$alkanoylamino substituents cited above.

Halogen substituents $R_3$, $R_4$, $R_5$, $R_6$, $R_9$, $R_{10}$, $R_{13}$, $R_{16}$, $R_{18}$ and $R_{19}$ may conveniently be fluoro or bromo and, preferably, chloro. The same meanings and preferred meanings apply to the other halogen substituents cited above.

$R_1$ and $R_2$ are each independently of the other preferably hydrogen, methyl or ethyl, most preferably hydrogen.

$R_3$, $R_4$, $R_5$ and $R_6$ are each independently of one another preferably hydrogen, $C_1-C_4$alkyl, $C_1-C_4$alkoxy or halogen, in particular hydrogen, methyl or ethyl. Hydrogen is most preferred.

$R_8$ is preferably methyl.

$R_9$, $R_{10}$, $R_{13}$, $R_{18}$ and $R_{19}$ are each independently of one another preferably hydrogen, $C_1-C_4$alkyl, $C_1-C_4$alkoxy or halogen, most preferably hydrogen.

$R_{11}$ is preferably $C_1-C_4$alkyl or, more particularly, unsubstituted phenyl or phenyl which is substituted by $C_1-C_4$alkyl, $C_1-C_4$alkoxy, $C_2-C_4$alkanoylamino or halogen. Most preferably, $R_{11}$ is unsubstituted phenyl.

$R_{12}$ is preferably hydrogen.

$R_{14}$ is preferably hydrogen or $C_1-C_4$alkyl, more particularly $C_1-C_4$alkyl and, most preferably, ethyl.

$R_{15}$ is preferably benzyl which is substituted in the phenyl ring by sulfo and which may contain $C_1-C_4$alkyl, $C_1-C_4$alkoxy, $C_2-C_4$alkanoylamino or halogen as further substituents. It is preferred that the phenyl ring is only substituted by sulfo.

$R_{16}$ is preferably hydrogen or $C_1-C_4$alkyl, most preferably hydrogen or methyl.

$R_{17}$ is preferably hydrogen.

Particularly preferred radicals A of formula (2) are those wherein $R_8$ is methyl, and $R_9$ and $R_{10}$ are each independently of the other hydrogen, $C_1-C_4$alkyl, $C_1-C_4$alkoxy or halogen, preferably hydrogen.

Particularly preferred radicals A of formula (4) are those of formula

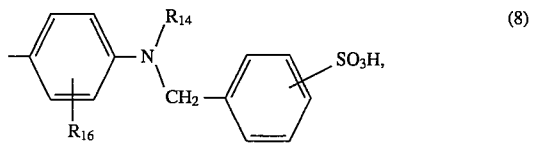

(8)

wherein $R_{14}$ is hydrogen or $C_1-C_4$alkyl, and $R_{16}$ is hydrogen, $C_1-C_4$alkyl, $C_1-C_4$alkoxy, $C_2-C_4$alkanoylamino or halogen. The most preferred meaning of $R_{14}$ is ethyl. Particularly preferred meanings of $R_{16}$ are hydrogen and $C_1-C_4$alkyl. Most preferably, $R_{16}$ is hydrogen or methyl.

Particularly preferred radicals A of formula (3) are those of formula

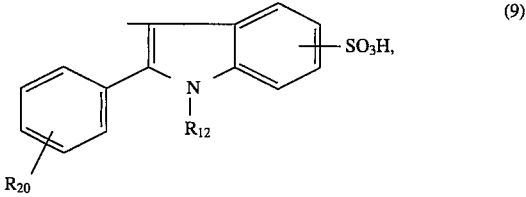

(9)

wherein $R_{12}$ is hydrogen or $C_1-C_8$alkyl, and $R_{20}$ is hydrogen, $C_1-C_4$alkyl, $C_1-C_4$alkoxy, $C_2-C_4$alkanoylamino or halogen. Most preferably, $R_{12}$ and $R_{20}$ are hydrogen.

Particularly preferred radicals A of formula (5) are those wherein $R_{17}$ and $R_{18}$ are hydrogen.

Particularly preferred radicals A of formula (7) are those wherein $R_{19}$ is hydrogen.

Preferred radicals A are those of formulae (2), (3), (4), (5) and (6), in particular radicals of formulae (3) and (6) and, most preferably, radicals of formula (6). Said radicals A have the meanings and preferred meanings indicated above.

Those reactive dyes of formula (1) are preferred wherein $R_1$, $R_2$, $R_3$, $R_4$, $R_5$ and $R_6$ are hydrogen, Y is a group of formula —OSO$_3$H and X is chloro. Z is preferably a group of formula —CH$_2$—CH$_2$—OSO$_3$H. The radical A has the meanings and preferred meanings defined above.

Particularly preferred reactive dyes are those of formula

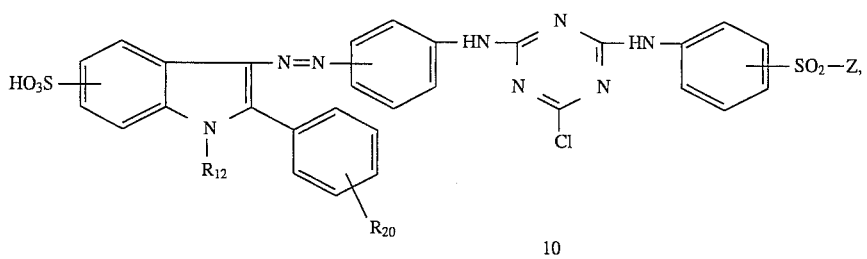
(10)

wherein $R_{12}$ is hydrogen or $C_1$–$C_8$alkyl, $R_{20}$ is hydrogen, $C_1$–$C_4$alkyl, $C_1$–$C_4$ alkoxy, $C_2$–$C_4$alkanoylamino or halogen, and Z is a group of formula —CH=CH$_2$ or, preferably, —CH$_2$—CH$_2$—OSO$_3$H. $R_{12}$ and $R_{20}$ are preferably hydrogen.

Very particularly preferred reactive dyes are those of formula

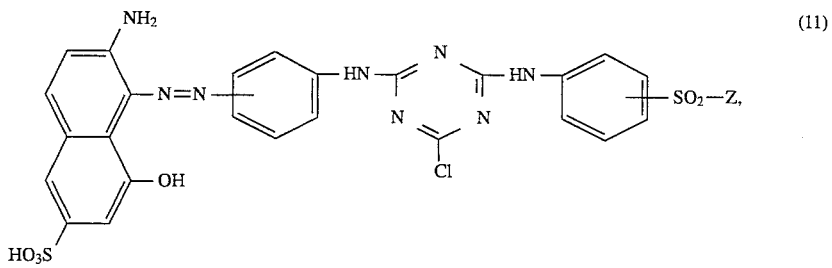
(11)

wherein Z is a group of formula —CH=CH$_2$ or, preferably, —CH$_2$—CH$_2$—OSO$_3$H.

The invention further relates to a process for the preparation of the reactive dyes of formula (1), which comprises condensing an amine of formula

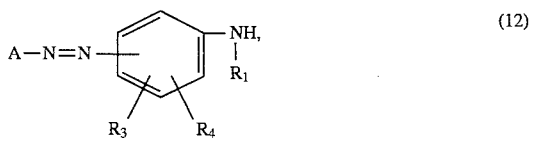
(12)

wherein A, $R_1$, $R_3$ and $R_4$ are as defined for formula (1), with a compound of formula

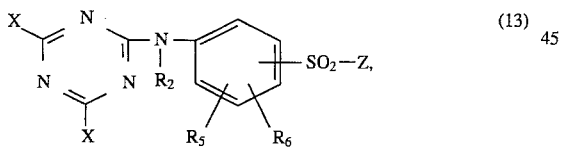
(13)

wherein Z, X, $R_2$, $R_5$ and $R_6$ are as defined for formula (1), and, if desired, converting the radical Z to the radical of formula —CH=CH$_2$.

The condensation is usually carried out in an aqueous solution at the temperature range from typically 0°–50° C. and at a pH of typically 4 to 9.

The conversion of the radical Z to the radical of —CH=CH$_2$ is usually carded out in aqueous medium under alkaline conditions and at a pH of typically 8 to 12. The pH value is conveniently adjusted with sodium hydroxide solution. It is possible to treat, for example, reactive dyes of formula (1) containing sulfatoethylsulfonyl radicals with a base such as sodium hydroxide, such that the sulfatoethylsulfonyl radicals are converted to vinylsulfonyl radicals.

In the novel process for the preparation of the reactive dyes of formula (1), the substituents of the compounds of formulae (12) and (13) have the meanings and preferred meanings defined above.

The compounds of formulae (12) and (13) are known or can be prepared by processes analogous to known ones.

Accordingly, the amines of formula (12) can be obtained by diazotising an amine of formula

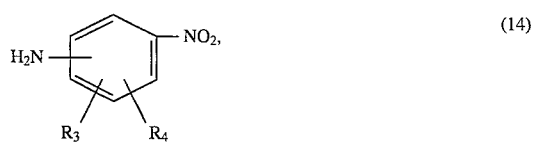
(14)

and then reducing the nitro group to the amino group, optionally introducing the radical $R_1$, and coupling the intermediate so obtained to a coupling component of formula

A—H (15)

wherein A, $R_1$, $R_3$ and $R_4$ are as defined for formula (1).

The diazotisation of the amine of formula (14) is normally effected by treatment with nitrous acid in an aqueous solution of mineral acid at low temperature, such as 0°–15° C., and the coupling to the coupling components of formula (15) is carried out in the acid to neutral pH range, preferably at pH 2–6.

The reduction of the nitro group can be effected in conventional manner according to known methods, for example in aqueous medium in the presence of sodium sulfide.

The radical $R_1$ can be introduced in usual manner by known alkylation reactions.

Compounds of formula (13) may be obtained by condensation of a compound of formula

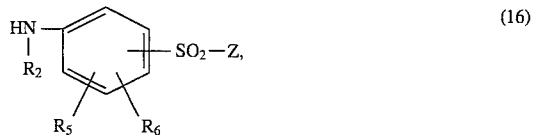
(16)

wherein Z, $R_2$, $R_5$ and $R_6$ are as defined for formula (1), with cyanuric fluoride or cyanuric chloride. The condensation is carried out in accordance with known methods.

The reactive dyes of formula (1) are either in the form of their free acids or, preferably, as the salts thereof. Suitable salts may be alkali metal salts, alkaline earth metal salts or ammonium salts, or the salts of an organic amine. Typical examples are the sodium, lithium, potassium or ammonium salts, or the salts of the mono-, di- or triethanol amine.

The reactive dyes of formula (1) are suitable for dyeing or printing nitrogen-containing or hydroxyl group-containing fibre materials. Typical examples of such materials are natural polyamide fibre materials, in particular wool, and synthetic polyamide fibre materials, such as polyamide 6 or polyamide 6.6. The reactive dyes of formula (1) are suitable for dyeing or printing synthetic and wool polyamide blends or yarns. Said textile material may be in a very wide range of presentation, such as fibre, yarn and woven or knitted goods.

The reactive dyes of formula (1) may be used for dyeing or printing in accordance with the standard dyeing or printing methods. In addition to water and the dyes, the dyeing liquors or print pastes may contain further auxiliaries such as wetting agents, antifoams, levelling agents or agents which modify the property of the textile material, for example softeners, flame retardants or dirt, water and oil repellents as well as water softeners and natural or synthetic thickeners, typically alginates and cellulose ethers.

Level dyeings of good allround fastness, in particular good fastness to rubbing, wetting, wet-rubbing and light, are obtained with the reactive dyes of formula (1). They are also distinguished by levelness, good fibre affinity, high reactivity, good fixation, excellent build-up and good compatibility with other dyes. The alkali treatment usual for fixation, for example in the presence of alkali, can largely be dispensed with.

The following Examples serve to illustrate the invention. Parts and percentages are by weight, unless otherwise stated. The ratio of parts by weight to parts by volume is the same as that of kilograms to liters.

WORKING EXAMPLE 70 parts of cyanuric chloride are stirred for 30 minutes in 950 parts of ice and 200 parts of water, with the addition of 3.6 parts of disodium dihydrogen phosphate 12 $H_2O$. To this mixture is then added over 10 minutes a solution, adjusted to pH 5.5, of 116.4 parts of 4-(β-sulfatoethylsulfonyl)aniline (92%) in 900 parts of water. The pH is kept at 4.5 to 5 by addition of 2N sodium hydroxide solution. Subsequently, 500 parts of acetone are added and the mixture is stirred in the temperature range from 0°–5° C. until the uptake of sodium hydroxide is complete. The precipitate is then collected by suction filtration and the filter product is washed first with water and then with acetone. The resultant filter product is dried at room temperature under vacuum, giving a compound which, in the form of the free acid, has the formula

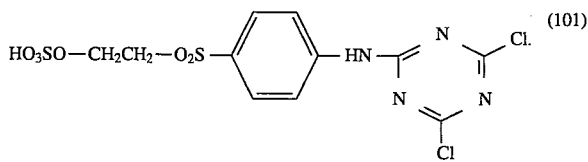

EXAMPLE 1

20 parts of the compound of formula (101) are suspended in 150 parts of water and then slowly added to a suspension containing, in 150 parts of water, 24.8 parts of a compound which, in the form of the free acid, has the formula

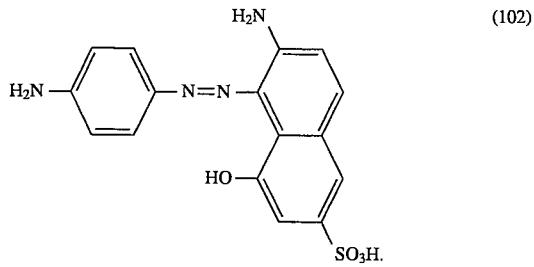

Subsequently, the pH is adjusted to 6 and the reaction mixture is warmed to 35° C. The pH is kept at 6 by addition of 2N sodium hydroxide solution. After 2 hours the uptake of sodium hydroxide is complete. The product is salted out with sodium chloride (c. 20% by volume, based on the reaction mixture) and collected by suction filtration. The filter product is washed with a small amount of an aqueous solution of sodium chloride and dried at 35° C. under vacuum, giving a dye which, in the form of the free acid, corresponds to the compound of formula

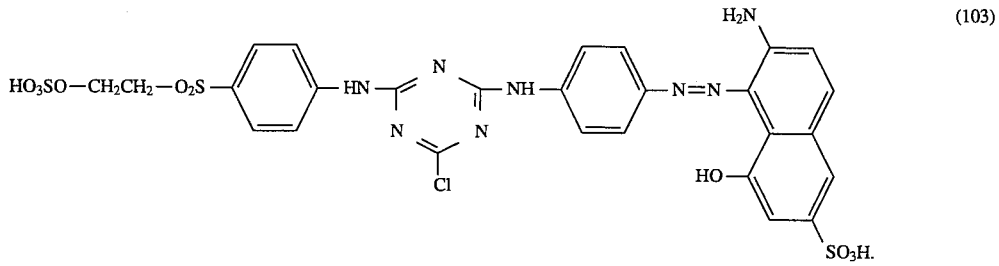

The dye of formula (103) dyes wool and synthetic polyamide in a brilliant red shade with good lightfastness and wetfastness properties.

EXAMPLES 2 TO 9

The dyes listed in the following Table can be obtained in accordance with the general procedure of Example 1. They dye wool and synthetic polyamide in the shades listed in column 3 of the Table. The dyes of the following Table have the formula

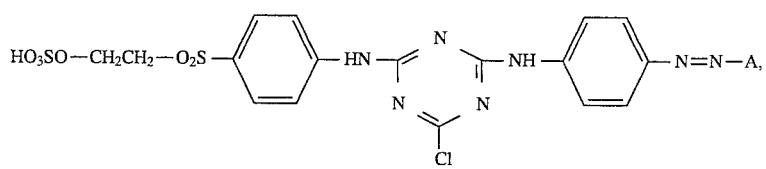

wherein A is as defined in column 2 of the Table.

| Ex. | A | shade on wool and polyamide |
|---|---|---|
| 2 | (3-methyl-5-hydroxy-1-(3-sulfophenyl)pyrazole) | golden yellow |
| 3 | (3-methyl-5-hydroxy-1-(2-chloro-5-sulfophenyl)pyrazole) | golden yellow |
| 4 | (3-methyl-5-amino-1-(3-sulfophenyl)pyrazole) | yellow |
| 5 | (2-phenyl-5-sulfo-indole) | golden yellow |
| 6 | (N-ethyl-N-(3-sulfobenzyl)aniline) | orange |
| 7 | (N-ethyl-N-(3-sulfobenzyl)-3-methylaniline) | orange |
| 8 | (2-methyl-4-sulfophenol) | yellow |
| 9 | (1-anilino-8-sulfonaphthalene) | red |

EXAMPLE 10 TO 15

In general accordance with the procedure of Example 1, dyes can be obtained which, in the form of the free acid, correspond to the formulae

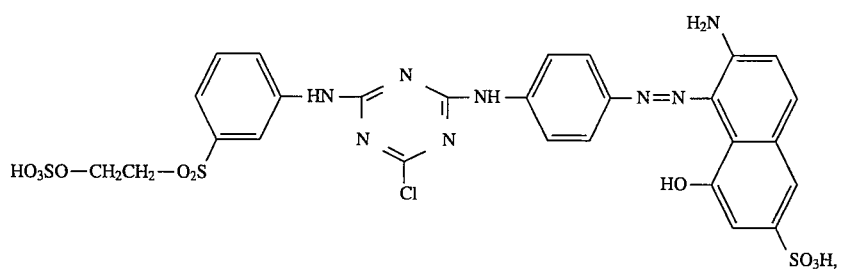 (104)

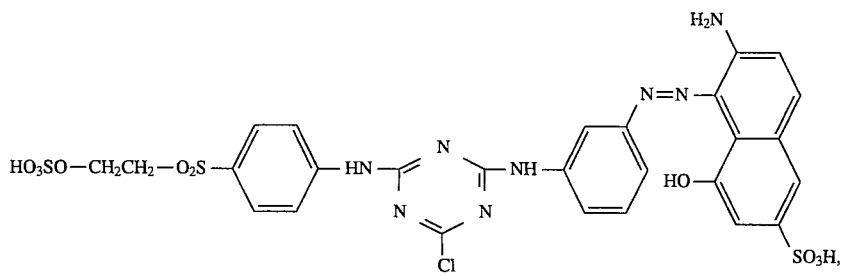 (105)

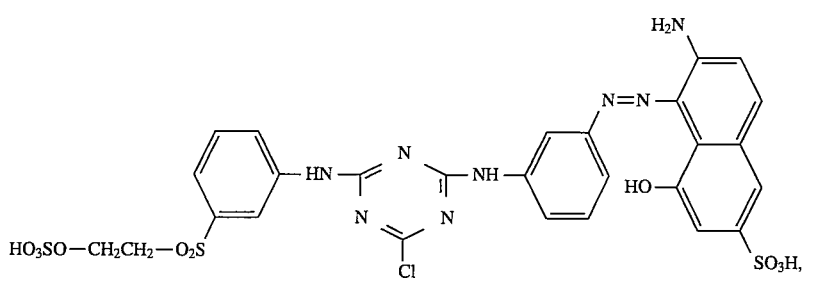 (106)

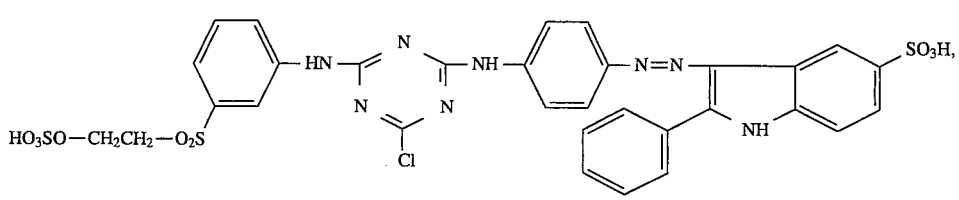 (107)

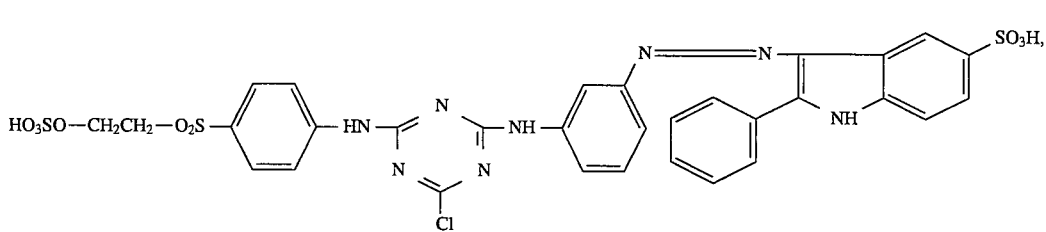 (108)

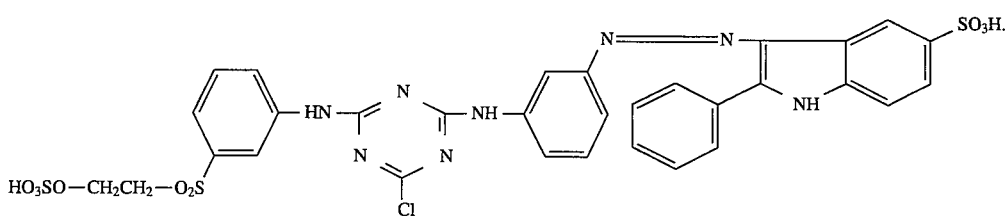 (109)

The dyes of formulae (104), (105) and (106) dye wool and synthetic polyamide in orange to red shades.

The dyes of formulae (107), (108) and (109) dye wool and synthetic polyamide in yellow to golden yellow shades.

The corresponding vinyl form of the dyes of Example 1 to 15 can be obtained by treating said dyes with an aqueous sodium hydroxide solution at a pH of c. 9.

DYEING PROCEDURE 0.1 part of the dye according to Example 1 is dissolved in 200 parts of demineralised water and to this solution are added 0.5 part of sodium sulfate, 0.1 part of a levelling agent (based on the condensate of a higher aliphatic amine and ethylene oxide) and 0.5 part of sodium acetate. The pH of the solution is then adjusted to 5.5 with acetic acid (80%). The dyebath is heated over 10 minutes to 50° C. and 10 parts of a woollen fabric are then put into it. The dyebath is heated over c. 50 minutes to 100° C. and dyeing is carried out for 60 minutes at this temperature. The bath is then allowed to cool to 90° C. and the dyed fabric is removed. The woollen fabric is washed with warm and cold water, then spun and dried, giving a red dyeing with good lightfastness and wetfastness properties as well as good fibre levelness.

What is claimed is:

1. A reactive dye of the formula

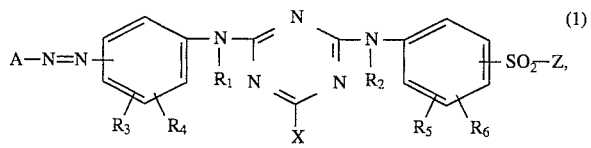

wherein $R_1$ and $R_2$ are each independently of the other hydrogen or $C_1$–$C_4$alkyl, $R_3$, $R_4$, $R_5$ and $R_6$ are each independently of one another hydrogen, $C_1$–$C_4$ alkyl, $C_1$–$C_4$alkoxy, $C_2$–$C_4$alkanoylamino, ureido or halogen, X is chloro or fluoro, Z is a group of formula —CH=$CH_2$ or —$CH_2$—$CH_2$—Y, and Y is a leaving group, and A is a radical of the formula

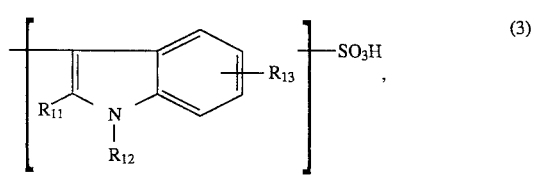

wherein $R_{11}$ is hydrogen, $C_1$–$C_8$alkyl or phenyl which is unsubstituted or substituted by $C_1$–$C_4$alkyl, $C_1$–$C_4$alkoxy, $C_2$–$C_4$alkanoylamino or halogen, $R_{12}$ is hydrogen or $C_1$–$C_8$alkyl, and $R_{13}$ is hydrogen, $C_1$–$C_4$alkyl, $C_1$–$C_4$alkoxy, $C_2$–$C_4$alkanoylamino or halogen;

or a radical of the formula

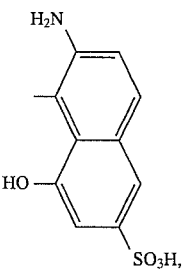

or a radical of the formula

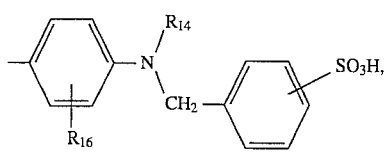

wherein $R_{14}$ is hydrogen or $C_1$–$C_4$alkyl, and $R_{16}$ is hydrogen, $C_1$–$C_4$alkyl, $C_1$–$C_4$ alkoxy, $C_2$–$C_4$alkanoylamino or halogen.

2. A reactive dye according to claim 1, wherein Y is a group of formula —$OSO_3H$.

3. A reactive dye according to claim 1, wherein X is chloro.

4. A reactive dye according to claim 1, wherein $R_1$ and $R_2$ are hydrogen.

5. A reactive dye according to claim 1, wherein $R_3$, $R_4$, $R_5$ and $R_6$ are hydrogen.

6. A reactive dye according to claim 1, wherein $R_1$, $R_2$, $R_3$, $R_4$, $R_5$ and $R_6$ are hydrogen, Y is a group of formula —$OSO_3H$, and X is chloro.

7. A reactive dye according to claim 1, wherein A defined as radical of formula (3) is a radical of formula

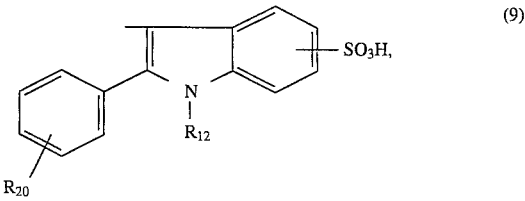

wherein $R_{12}$ is hydrogen or $C_1$–$C_8$alkyl, and $R_{20}$ is hydrogen, $C_1$–$C_4$alkyl, $C_1$–$C_4$alkoxy, $C_2$–$C_4$alkanoylamino or halogen.

8. A reactive dye according to claim 1, of formula

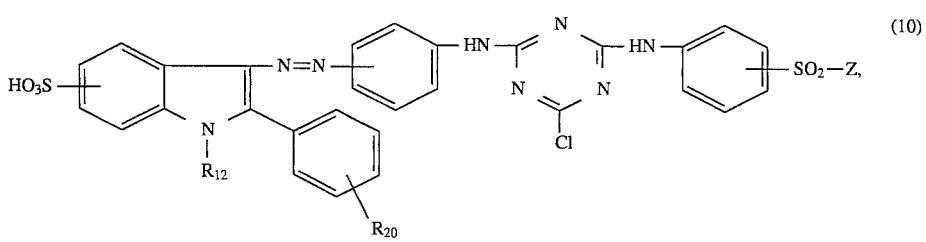

wherein $R_{12}$ is hydrogen or $C_1$–$C_8$alkyl, $R_{20}$ is hydrogen, $C_1$–$C_4$alkyl, $C_1$–$C_4$ alkoxy, $C_2$–$C_4$alkanoylamino or halogen, and Z is a group of formula —CH=$CH_2$ or —$CH_2$—$CH_2$—$OSO_3H$.

9. A reactive dye according to claim 1, of formula

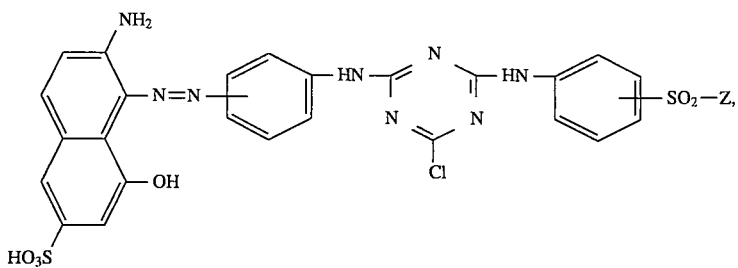

(11)

wherein Z is a group of formula —CH=CH$_2$ or —CH$_2$—CH$_2$—OSO$_3$H.

10. A reactive dye according to claim 1, wherein Z is a group of formula —CH$_2$—CH$_2$—OSO$_3$H.

11. A process for dyeing or printing hydroxyl group-containing or nitrogen-containing fibre material, which comprises the step of applying to said fibre material a tinctorial amount of a reactive dye as claimed in claim 1.

12. A process according to claim 11, wherein said fibre material is natural or synthetic polyamide fibre material.

* * * * *